Feb. 8, 1966 L. L. CHARLSON 3,233,524
FLUID OPERATED MOTOR
Filed Sept. 5, 1962 3 Sheets-Sheet 2
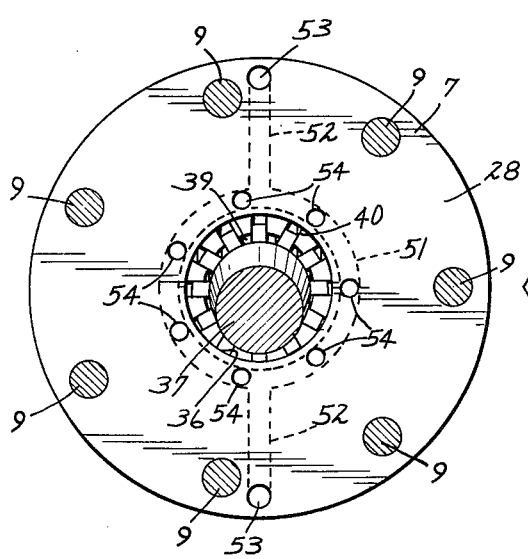
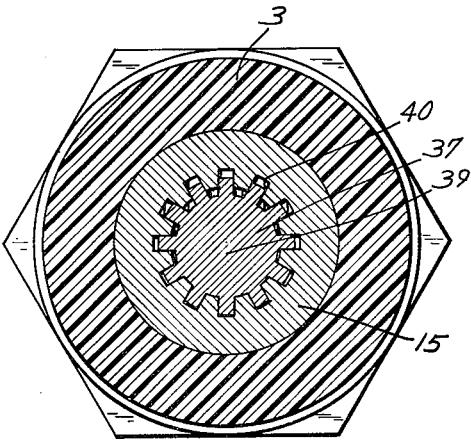
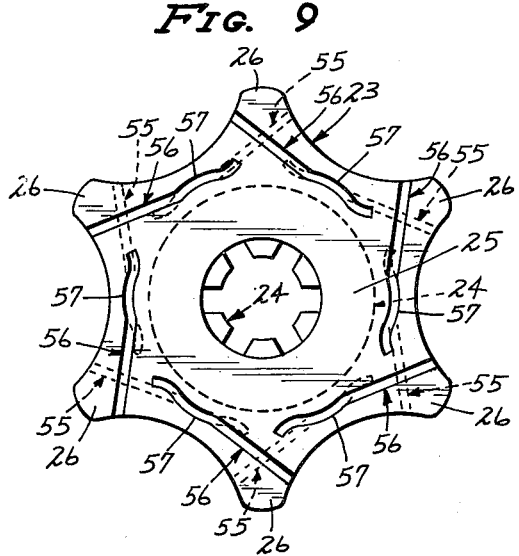
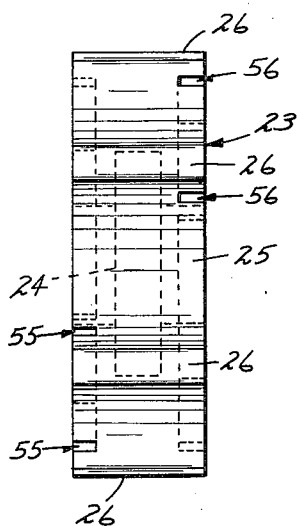
INVENTOR.
LYNN L. CHARLSON
BY
Merchant, Merchant & Gould
ATTORNEYS INVENTOR.
LYNN L. CHARLSON
BY
Merchant, Merchant & Gould
ATTORNEYS United States Patent Office 3,233,524
Patented Feb. 8, 1966

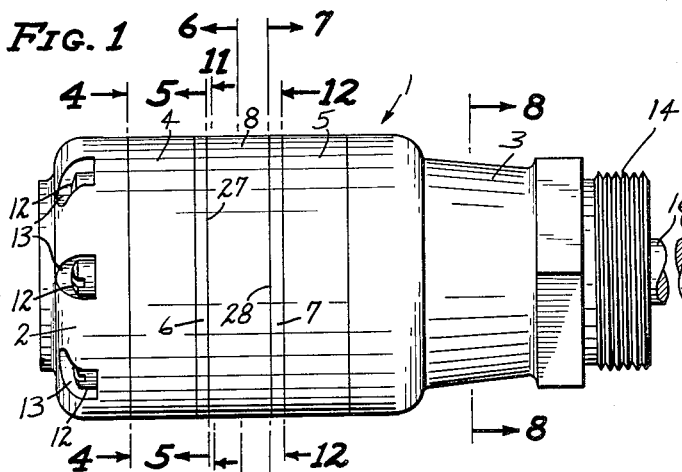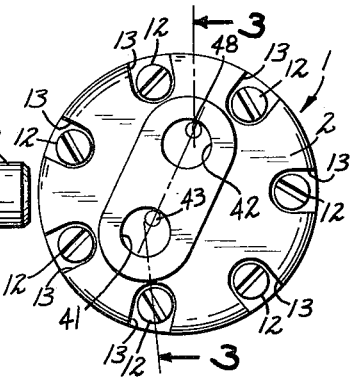

3,233,524
FLUID OPERATED MOTOR
Lynn L. Charlson, Minneapolis, Minn., assignor to Germane Corporation, Minneapolis, Minn., a corporation of Minnesota
Filed Sept. 5, 1962, Ser. No. 221,573
13 Claims. (Cl. 91—56)

My present invention relates generally to fluid pressure apparatus, and more particularly to rotary fluid pressure motors, fluid pumps and the like.

More specifically, my invention is in the nature of a device which, while it is primarily intended for use as a motor, will function as a fluid pump, if desired.

Generally, my improved device utilizes a pair of cooperating internally and externally toothed gear members, one of which partakes of hypocycloidal movement relative to the other thereof, the cooperating teeth of said members moving into and out of intermeshing engagement and being shaped to have substantially sealing engagement with each other during said movement, whereby to find fluid chambers which expand and contract during relative movement between said members.

One of the objects of my invention is the provision of a fluid-operated motor which produces a relatively high torque output with a relatively low pressure fluid input.

Another object of my invention is the provision of a fluid-operated motor having a highly simplified and novel fluid passage means whereby fluid under pressure is conducted to successive fluid chambers to cause expansion of said chambers, and conducted away from other chambers in succession to permit contraction thereof. To this end, I provide body means defining end wall surfaces between which said toothed members are disposed, and having fluid passage means terminating in circumferentially spaced openings through said end wall surfaces; and fluid channels in the opposite ends of one of said toothed members for conducting fluid between said openings and given ones of said expanding and contracting chambers.

Another object of my invention is the provision of a fluid motor, as set forth, which is extremely simple and inexpensive to produce, which is highly efficient in operation, and which is rugged in construction and durable in use.

The above, and still further highly important objects and advantages of my invention will become apparent from the following detailed specification, appended claims, and attached drawings.

Referring to the drawings, which illustrate the invention, and in which like reference characters indicate like parts throughout the several views:

FIG. 1 is a view in side elevation of a fluid pressure motor, some parts being broken away;

FIG. 2 is a view in end elevation, as seen from the left with respect to FIG. 1;

FIG. 3 is an enlarged longitudinal section taken substantially on the line 3—3 of FIG. 2, some parts being broken away;

Figure 11:
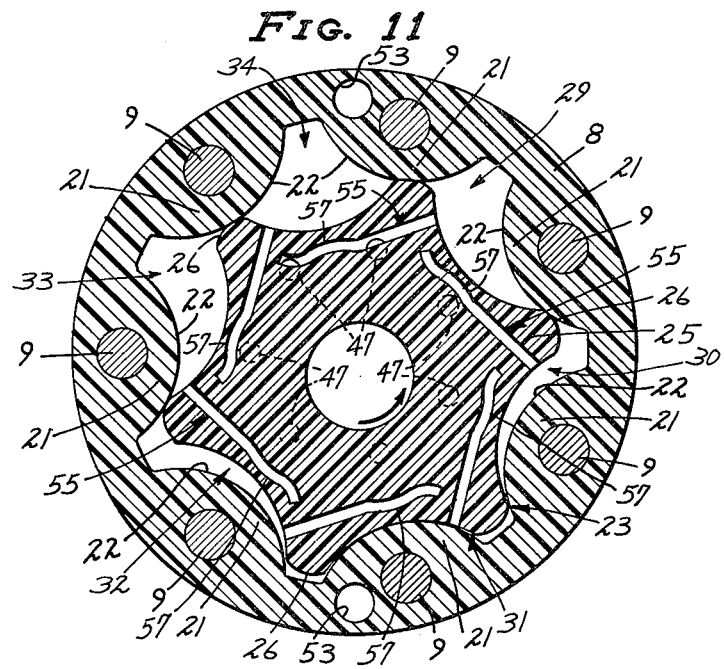
Figure 12:
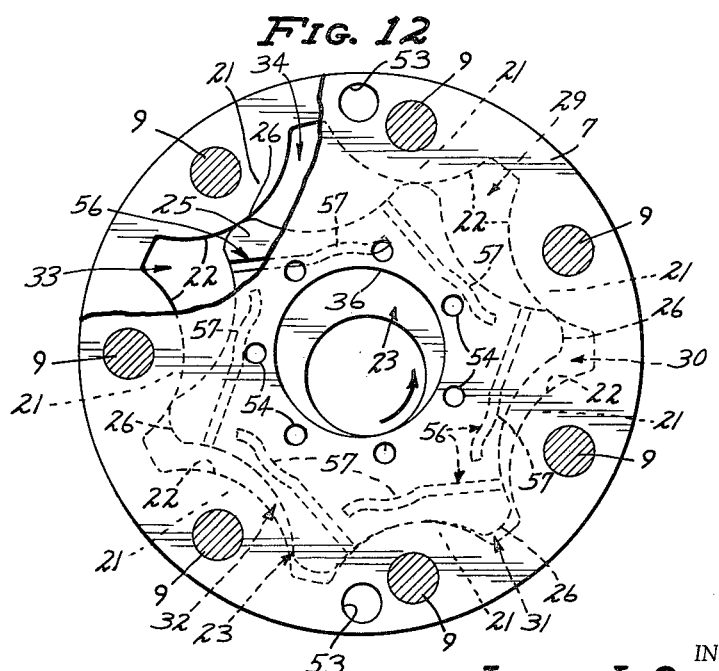

FIGS. 4, 5 and 6 are transverse sections taken on the lines 4—4, 5—5, and 6—6 respectively of FIG. 1;

FIGS. 7 and 8 are transverse sections taken on the lines 7—7 and 8—8 respectively of FIG. 1, on an enlarged scale;

FIG. 9 is an enlarged view in end elevation of an externally toothed gear member of my invention;

FIG. 10 is a view in side elevation, as seen from the right with respect to FIG. 9;

FIG. 11 is an enlarged transverse section taken on the line 11—11 of FIG. 1; and FIG. 12 is an enlarged transverse section taken on the line 12—12 of FIG 1, some parts being broken away.

In the preferred embodiment of my invention illustrated, body means, indicated generally by the reference character 1, is shown as comprising a plurality of axially aligned body sections including, a pair of opposite end sections 2 and 3, intermediate sections 4 and 5, a pair of plate-like sections 6 and 7, and a central section 8. The several sections 2–8 are axially aligned, each having a plurality of circumferentially spaced openings for reception of elongated screws or the like 9, the openings in the end section 3 being indicated at 10, see FIG. 3, and screw threaded for reception of the screw threaded ends 11 of the screws 9, the heads 12 of the screws 9 being received in recesses 13 in the end section 2, whereby the sections 2–8 are rigidly secured together in said axial alignment.

The end section 3 is formed to provide a screw threaded portion 14 by which the body 1 may be secured to a device, not shown, but having a part to be driven by the instant motor. Further, the end section 3 is bored to journal drive shaft means including inner and outer drive shaft sections 15 and 16, the former of which is tubular in form, and the latter of which is provided at its inner end with an enlarged head 17 that is welded or otherwise rigidly secured to the adjacent end of the tubular drive shaft section 15. The head 17 and adjacent end of the tubular section 15 bear against an annular shoulder 18 in the body section 3, the opposite end of the tubular shaft 15 being formed to provide a flange 19 which bears against the adjacent intermediate body section 5 and a second annular shoulder 20 in the end section 3 to limit axial movements of the shaft sections 15 and 16 relative to the body 1. Preferably, the body sections 2–5 and 8 are made from non-metallic material, such as synthetic plastics or the like, the sections 6 and 7, together with the shaft sections 15 and 16 being made from steel or other suitable metal.

The body section 8 is an annular internally toothed ring member the teeth 21 of which are, for the purpose of the present example, seven in number having arcuate faces 22. A cooperating externally toothed star member or rotor 23 comprises a central internally splined metallic core 24 and a molded body portion 25 in which said cord is imbedded, the body portion 25 being molded from synthetic plastic material and comprising a plurality of teeth 26 that are six in number. The rotor 23 is adapted to partake of hypocycloidal movement within the internally toothed body section or stator 8, with the teeth 26 moving into and out of intermeshing engagement with successive ones of the teeth 21, the outer end portions of the teeth 26 having substantially sealing engagement with the arcuate faces 22 of the teeth 21. It will be noted that during hypocycloidal movement of the rotor 23, the same moves in an orbit within the internally toothed member or body section 8 with the axis of the rotor 23 moving in an orbit about the axis of the internally toothed member or body section 8. The body sections 6 and 7 have opposed inner wall surfaces 27 and 28 respectively, see FIGS. 5 and 7, which cooperate with the teeth 21 and 26 to define fluid chambers 29–34, see FIGS. 6, 11 and 12, each of said chambers alternately expanding and contracting during orbital movement of the externally toothed rotor 23 within the internally toothed body section 8. The body sections 5 and 7 define central openings 35 and 36 respectively, through which extends a rigid drive link or shaft 37 that is provided at its opposite ends with splines or the like 38 and 39. The spline 38 has loose meshing engagement with the internal spline of the rotor core 24, the spline 39 intermeshing with an internal spline 40 in the tubular drive shaft section 15 adjacent the head 17 of the shaft section 16, see FIG. 3. It will be noted that the opposite ends of the drive link or shaft 37 are rounded and engage the plate-like body section 6 and shaft head 17, whereby to limit axial movement of the drive link 37.

The fluid motor construction shown and above described is similar to that disclosed in my prior United States Letters Patent 2,821,171, orbital or hypocycloidal movement of the externally toothed member causing the same to rotate on its own axis at the rate of one revolution for as many complete cycles of orbital movement as the number of teeth in the internally toothed member, by reason of the fact that, in the form illustrated, there is one less number of teeth in the externally toothed member than in the internally toothed member. This rotary movement of the externally toothed member is transferred to the drive shaft sections 15 and 16 by the drive link or shaft 37.

The end section 2 of the body means 1 is formed to provide internally threaded inlet and outlet ports 41 and 42 respectively, the inlet port 41 being adapted to be connected to a suitable source of fluid pressure, such as a pump, not shown. The outlet port 42 is adapted to be connected to a return line, not shown, in the event that a return conduit is required. With the use of air under pressure as the motivating or propelling agent for the motor, the outlet port 42 may be exposed to atmosphere, or the same may be connected to a suitable muffler, not shown, if such is desired. A fluid passage 43 extends through the end section 2 from the inlet port 41 to an annular channel 44 in the adjacent end of the body section 4, and a cooperating passage 45 connects the channel 44 with a second annular channel 46 in the opposite end of the body section 4. The channel 46 communicates with a plurality of circumferentially spaced openings 47 that extend through the plate-like body section 6, the openings 47 being equal in number to the internal teeth 21 and arranged in a circle concentric with the axis of the body means 1. With reference to FIG. 11, it will be seen that the openings 47 are disposed radially inwardly with respect to the bottoms of the teeth 26 of the externally toothed rotor 23, in all positions of orbital movement of the rotor 23.

An outlet passage 48 connects the outlet port 42 with a circumferential channel 49 in the body section 4 and from which extend diametrically opposed radial channels 50, see FIGS. 3–5. The body section 5 is likewise provided with an annular channel 51 having a pair of diametrically opposed radial passages 52 extending outwardly therefrom, see FIGS. 2 and 7. The outer ends of the channels 50 and 52 are connected by axially extending passages 53 in the body sections 4 and 6–8. The plate-like body section 7 has extending therethrough a plurality of circumferentially spaced openings 54, each of which is axially aligned with a different one of the openings 47 in the plate-like body section 6, each of the openings 54 registering with the annular channel 51 in the body section 5.

The externally toothed star member or rotor is provided at one of its ends with a plurality of axially outwardly opening fluid channels 55, one for each of the teeth 26, and at its opposite end with a like plurality of similar channels 56. The channels 55 and 56 have arcuate inner end portions 57 disposed radially inwardly of and between the teeth 26, see particularly FIGS. 9, 11 and 12, the outer ends of the channels 55 and 56 communicating with different ones of the fluid chambers 29–34. The channels 55 are each arranged in generally axially opposed relationship with a different one of the channels 56, each of the generally axially opposed channels extending to a different one of said chambers. For example, and with reference to FIGS. 11 and 12, a given one of the channels 55 is shown as being in communication with the fluid chamber 29, and the opposite channel 56 being in communication with the fluid chamber 33.

Assuming that the inlet port 41 is connected to a source of fluid, such as air, under pressure, said fluid moves inwardly through the passages 43 and 45, annular channel 46, and into the chamber 29 through the openings 47 in register with a given passage 55 communicating with the chamber 29. At the same time, the corresponding or opposite channel 56 is in register with at least one of the ports 54 to permit fluid to escape from the fluid chamber 33 through the channels 51 and 52, passages 53, channels 50 and 49, and passage 48 to the outlet port 42. Thus, the chamber 29 will be caused to expand, imparting orbital and rotary movement to the externally toothed star member 23 in a counterclockwise direction with respect to FIGS. 6, 11 and 12. As the star member or rotor 23 partakes of its hypocycloidal movement, other opposed channels 55 and 56 move into registration with successive ones of the corresponding openings 47 and 54 so that successive chambers 29–34 are placed under pressure from the inlet port 41, whereas others thereof are in communication with the outlet port 42. Thus, successive ones of the chambers 29–34 are subject to relatively high pressure and other successive ones of said chambers are subject to atmospheric or relatively low pressure, resulting in continuous orbital movement of the externally toothed rotor 23. As above indicated, inasmuch as there are seven teeth 21 in the internally ring toothed member or body section 3 and one less this number of teeth in the rotor 23, the rotor 23 makes one complete revolution on its own axis for every seven cycles of its orbital movement relative to the internally ring toothed member 3. The loose spline connection between the rotor 23 and drive link 37 causes the splined end 38 of the drive link 37 to partake of common orbital and common rotary movement with the rotor 23, the spline connection 39–40 causing only rotary movement to be imparted to the drive shaft sections 15 and 16.

It will be appreciated that while the ports 41 and 42 have been indicated as inlet and outlet ports respectively, the outlet port 42 may be used as an inlet port and the port 41 as an outlet port, thus reversing the direction of orbital and rotary movement of the externally toothed rotor 23. It will be further appreciated that if desired, the drive shaft 15–16 may be stationary and the body 1 used as a rotary member.

While I have shown and described a preferred embodiment of my fluid pressure operated motor, it will be understood that the same is capable of modification, and that modification may be made without departure from the spirit and scope of the invention, as defined in the claims.

What I claim is:

1. In a rotary fluid pressure motor,
   (a) body means comprising an internally toothed ring member and defining flat opposed end wall surfaces at opposite ends of said internally toothed member,
   (b) a cooperating, externally toothed star member having at least one less number of teeth than said internally toothed ring member and disposed eccentrically within said internally toothed ring member and engaging said end wall surfaces,
   (c) one of said members being movable in an orbit with its axis moving in an orbit about the axis of the other of said members,
   (d) the teeth of said members moving successively into and out of intermeshing engagement responsive to orbital movement of the orbiting one of said members and having substantially sealing engagement with each other to define with said end wall surfaces successively expanding and contracting fluid chambers, (e) shaft means journalled in said body means for relative rotation therebetween, (f) and a rigid link operatively coupled at one end to said shaft means and at its other end to said orbiting member for common orbital movement therewith, whereby to impart relative rotation between said shaft means and body means responsive to orbital movement of said orbiting member, (g) one of said means having an inlet port and one of said means having an outlet port, said body means having fluid passage means communicating with said inlet and outlet ports, (h) the fluid passage means communicating with said inlet port terminating in a plurality of circumferentially spaced openings through one of said end wall surfaces below the level of the bottom of the teeth of said orbiting member, (i) the fluid passage means communicating with said outlet port terminating in a plurality of circumferentially spaced openings through the other of said end wall surfaces below the level of the bottom of the teeth of said orbiting member, (j) said orbiting member having a plurality of axially opening inlet channels in one end and a like plurality of similar outlet channels in its opposite end, (k) each of said chambers communicating with a different one of said inlet channels, and with a different one of said outlet channels, (l) said channels being positioned to move into and out of register with successive ones of said openings in their adjacent end wall surfaces during orbital movement of said orbiting member.

2. In a rotary fluid pressure motor, (a) body means comprising an internally toothed ring member and defining flat opposed end wall surfaces at opposite ends of said internally toothed member, (b) a cooperating externally toothed star member having at least one less number of teeth than said internally toothed ring member and disposed eccentrically within said internally toothed ring member and engaging said end wall surfaces, (c) one of said members being movable in an orbit with its axis moving in an orbit about the axis of the other of said members, (d) the teeth of said members moving successively into and out of intermeshing engagement responsive to orbital movement of the orbiting one of said members and having substantially sealing engagement with each other to define with said end wall surfaces successively expanding and contracting fluid chambers, (e) shaft means journalled in said body means for relative rotation therebetween, (f) and a rigid link operatively coupled at one end to said shaft means and keyed at its other end to said orbiting member for common orbital movement therewith, whereby to impart relative rotation between said shaft means and body means at a speed equal to the speed of rotation of said orbiting member on its own axis responsive to said orbital movement thereof, (g) one of said means having an inlet port and an outlet port, said body means having fluid passages communicating with said inlet and outlet ports, (h) the fluid passage communicating with said inlet port terminating in a plurality of circumferentially spaced openings through one of said end wall surfaces below the level of the bottom of the teeth of said orbiting member, (i) the fluid passage communicating with said outlet port terminating in a plurality of circumferentially spaced openings through the other of said end wall surfaces below the level of the bottom of the teeth of said orbiting member, (j) said orbiting member having a plurality of axially outwardly opening inlet channels in one end and a like plurality of similar outlet channels in its opposite end, (k) each of said chambers communicating with a different one of said inlet channels and with a different one of said outlet channels, (l) said channels being positioned to move into and out of register with successive ones of said openings in their adjacent end wall surfaces during orbital movement of said orbiting member.

3. The structure defined in claim 2 in which said internally toothed ring member is a fixed portion of said body means, said externally toothed star member partaking of said orbital movement.

4. The structure defined in claim 2 in which the openings through said end wall surfaces are disposed radially inwardly with respect to the bottoms of the teeth of said externally toothed star member, said star member moving in said orbit and rotating on its own axis responsive to said orbital movement.

5. The structure defined in claim 2 in which said body means comprises a plurality of body sections including a pair of plate-like members which define said end wall surfaces, said openings extending through said plate-like members, said inlet and outlet being disposed in one of said body sections.

6. The structure defined in claim 5 in which said openings through each of said plate-like members are equal in number to the teeth of said internally toothed ring member.

7. In a rotary fluid pressure device of the type comprising a relatively stationary body having an internally toothed ring member fixed therein and a cooperating externally toothed star member with at least one less number of teeth than said ring member and disposed eccentrically within said ring member and movable in an orbit with its axis moving in an orbit about the axis of said ring member, the teeth of said members moving successively into and out of intermeshing substantially sealing engagement responsive to orbital movement of said star member, said body having spaced parallel wall surfaces disposed in sliding wear engagement with said star member and defining the axial limits of expanding and contracting chambers formed between the teeth of said ring and star members during orbital movement and resultant rotation of said star member, the improvement characterized by a fluid passage arrangement including an inlet passage disposed axially to said star member and extending through one of said wall surfaces and associated with axially outwardly opening channels in the adjacent end of said orbiting member and extending generally transversely of the axis thereof for delivery of fluid sequentially to said chambers during expansion thereof, and an outlet passage separate from said inlet passage extending through the other of said wall surfaces and associated with axially outwardly opening channels in the other end of said orbiting member and extending generally transversely of the axis thereof for venting fluid from said chambers during contraction thereof, said outlet passage being independent of and having no common porting with said inlet passage.

8. The structure defined in claim 7 in which one of said wall surfaces defines a plurality of circumferentially spaced ports communicating with said inlet passage and with given ones of said channels in the adjacent end of said star member during orbital movement of said star member and in which said other wall surface defines a plurality of circumferentially spaced outlet ports communicating with said outlet passage and with given ones of said channels in the other adjacent end of said star member during orbital movements thereof.

9. The structure defined in claim 8 in which the channels in each end of the star member are equal in number to the number of teeth in said star member, and in which the ports in each of said wall surfaces are equal in number to the number of teeth in said ring member.

10. The structure defined in claim 9 in which the ports in one of said wall surfaces are each axially aligned with a different one of the ports in the other of said wall surfaces.

11. A rotary fluid pressure device comprising fluid inlet and outlet means, an internally toothed ring member and a meshing externally toothed star member having a less number of teeth than said ring member, first and second spaced parallel end walls with each of the two members extending between said walls and said first wall being fixed relative to said ring member, one of said members being an orbital member movable in an orbit about the axis of the other member and rotatable relative thereto about its own axis such that during orbital and rotational movement of said orbital member the teeth of said members intermesh in substantial sealing engagement to form a group of expanding fluid chambers and a group of contracting fluid chambers simultaneously on diametrically opposite sides of said star member, said first wall and said star member having a pair of surfaces therebetween which slidably engage each other, a series of port passages defined in one of said surfaces and arrranged circumferentially relative to the axis of one of said members, a series of obliquely extending groove passages defined in the other of said surfaces and arranged circumferentially relative to the axis of the other of said members, both of said series of passages being entirely within the radial confines of said star member for all positions of said star member during relative orbital movement between said members, one of said series of passages having each passage thereof in direct communication with a corresponding one of the fluid chambers between the two members and the other of said series of passages having each passage thereof in direct fluid communication with one of said fluid inlet and outlet means, said movement of said orbital member effecting fluid communication between said port and groove passages so that each port passage sequentially communicates with each groove passage to provide constant fluid communication between one of said groups of chambers and one of said fluid inlet and outlet means, and fluid passage means responsive to movement of said orbital member so that the other one of said groups of chambers is in constant fluid communication with the other of said fluid inlet and outlet means.

12. A rotary fluid pressure device comprising fluid inlet and outlet means, an internally toothed ring member and a meshing externally toothed star member having a less number of teeth than said ring member, one of said members being an orbital member movable in an orbit about the axis of the other member and rotatable relative thereto about its own axis so that during orbital and rotational movement of said orbital member the teeth of said members intermesh in substantial sealing engagement to form a group of expanding fluid chambers and a group of contracting fluid chambers simultaneously on diametrically opposite sides of said star member, a series of port passages defined in a surface of one of said members and arranged circumferentially relative to the axis thereof, a series of groove passages defined in a surface of the other of said members and arranged circumferentially relative to the axis thereof, both of said series of passages being entirely within the radial confines of said star member for all positions of said star member during relative orbital movement between said members, one of said series of passages having each passage thereof in direct communication with a corresponding one of the fluid chambers between the two members and the other of said series of passages having each passage thereof in direct fluid communication with one of said fluid inlet and outlet means, said movement of said orbital member effecting fluid communication between said port and groove passages so that each port passage sequentially communicates with each groove passage to provide constant fluid communication between one of said groups of chambers and one of said fluid inlet and outlet means, and fluid passage means responsive to movement of said orbital member so that the other one of said groups of chambers is in constant fluid communication with the other of said fluid inlet and outlet means.

13. A rotary fluid pressure device comprising fluid inlet and outlet means, an internally toothed ring member and a meshing externally toothed star member having a less number of teeth than said ring member, first and second spaced parallel end walls with each one of the two members extending between said walls, said first wall being fixed relative to said ring member, one of said members being an orbital member movable in an orbit about the axis of the other member and rotatable relative thereto about its own axis such that during orbital and rotational movement of said orbital member the teeth of said members intermesh in substantial sealing engagement to form a group of expanding fluid chambers and a group of contracting fluid chambers simultaneously on diametrically opposite sides of said star member, said first wall and said star member having a pair of surfaces which slidably engage each other, a series of passages defined in said star member surface and arranged circumferentially relative to the axis of that member, passage means defined in said first wall surface arranged symetrically relative to the axis of said ring member, said series of passages and said passage means being entirely within the radial confines of said star member for all positions of said star member during relative orbital movement between said members, said series of passages having each passage thereof in direct communication with a corresponding one of the fluid chambers between the two members and passage means being in direct fluid communication with one of said fluid inlet and outlet means, said movement of said orbital member effecting fluid communication between said series of passages and said passage means so that each passage of said series sequentially communicates with said passage means to provide constant fluid communication between one of said groups of chambers and one of said fluid inlet and outlet means, and fluid passage means responsive to movement of said orbital member so that the other one of said groups of chambers is in constant fluid communication with the other of said fluid inlet and outlet means.

References Cited by the Examiner

UNITED STATES PATENTS

| 2,821,171 | 1/1958 | Charlson | 121—39 |
| 2,871,831 | 2/1959 | Patin | 123—12 |
| 2,989,951 | 6/1961 | Charlson | 103—130 |
| 3,087,436 | 4/1963 | Dettlof et al. | 103—130 |

SAMUEL LEVINE, *Primary Examiner.*

FRED E. ENGELTHALER, *Examiner.*